Sept. 11, 1923.
J. D. ELSOM
1,467,716
INSPECTION INDICATOR
Filed July 6, 1920
2 Sheets-Sheet 1
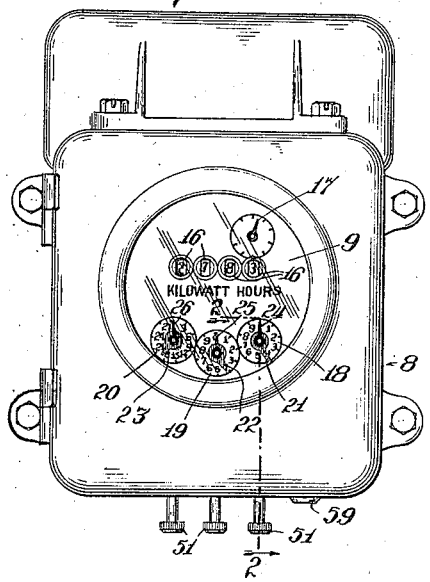
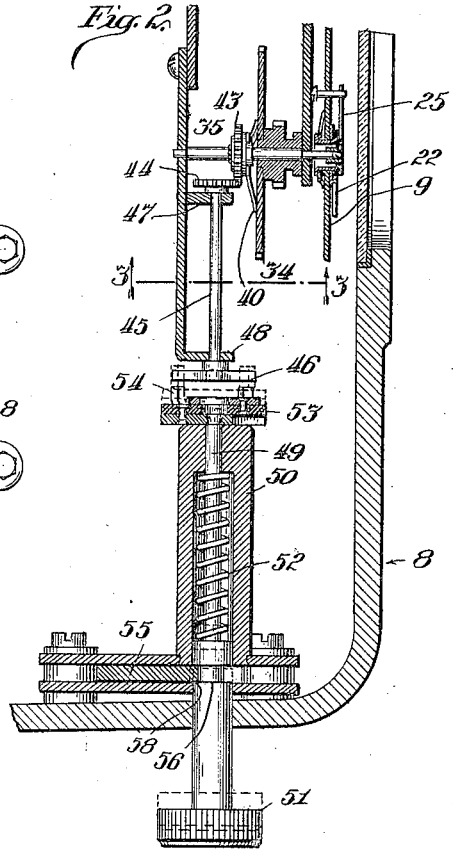
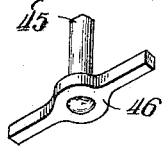
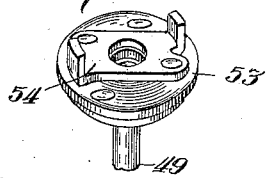
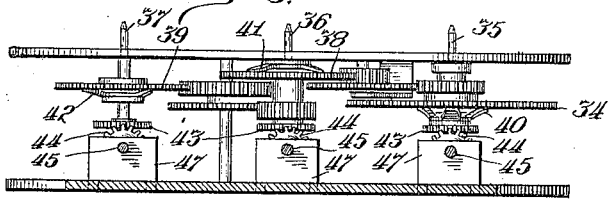
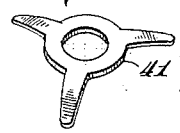
Inventor
James D. Elsom,
Adams & Jackson.
Attorneys.
Witness
Milton Lenoir Sept. 11, 1923.
J. D. ELSOM
INSPECTION INDICATOR
Filed July 6, 1920

Patented Sept. 11, 1923.

1,467,716

UNITED STATES PATENT OFFICE.

JAMES D. ELSOM, OF OAK PARK, ILLINOIS, ASSIGNOR TO ECONOMY ELECTRIC DEVICES COMPANY, OF CHICAGO, ILLINOIS, A CORPORATION OF ILLINOIS.

INSPECTION INDICATOR.

Application filed July 6, 1920. Serial No. 394,300.

*To all whom it may concern:*

Be it known that I, JAMES D. ELSOM, a citizen of the United States, and a resident of Oak Park, in the county of Cook, in the State of Illinois, have invented certain new and useful Improvements in Inspection Indicators, of which the following is a specification, reference being had to the accompanying drawings.

My invention relates generally to measuring instruments, but has more particularly to do with means for promoting the efficient operation of devices operated by power, and especially by electric power, as for example, street cars. Most translators of energy require inspection at more or less frequent intervals in order that the translator may be maintained at its highest state of efficiency, and the object of my invention, broadly considered, is to provide means correlated with the work done by a piece of mechanism for directly indicating when such mechanism should be inspected. More specifically, as applied to devices operated by electric power, my invention contemplates the indication of inspection periods determined by the factor of energy consumption, as that has been found to be the most accurate basis on which to rely, and a particular object of my invention is to provide an inspection indicator which will meet the requirements of street car service.

I accomplish my objects preferably by means of the apparatus illustrated in the drawings and hereinafter described. What I regard as new is set forth in the claims.

In the accompanying drawings,—

Fig. 1 is a front elevation of an electricity meter equipped with three inspection indicators;

Fig. 2 is an enlarged detail, being a partial vertical section on line 2—2 of Fig. 1;

Fig. 3 is a detail, being a partial horizontal section on line 3—3 of Fig. 2 looking up, illustrating the driving train which connects the several inspection indicators together;

Fig. 4 is a perspective view of the upper end portion of one of the resetting devices;

Fig. 5 is a perspective view of the lower end portion of one of the resetting shafts;

Fig. 6 is a perspective view of one of the spring washers through which the arbors of the indicator hands are driven.

Figure 7:
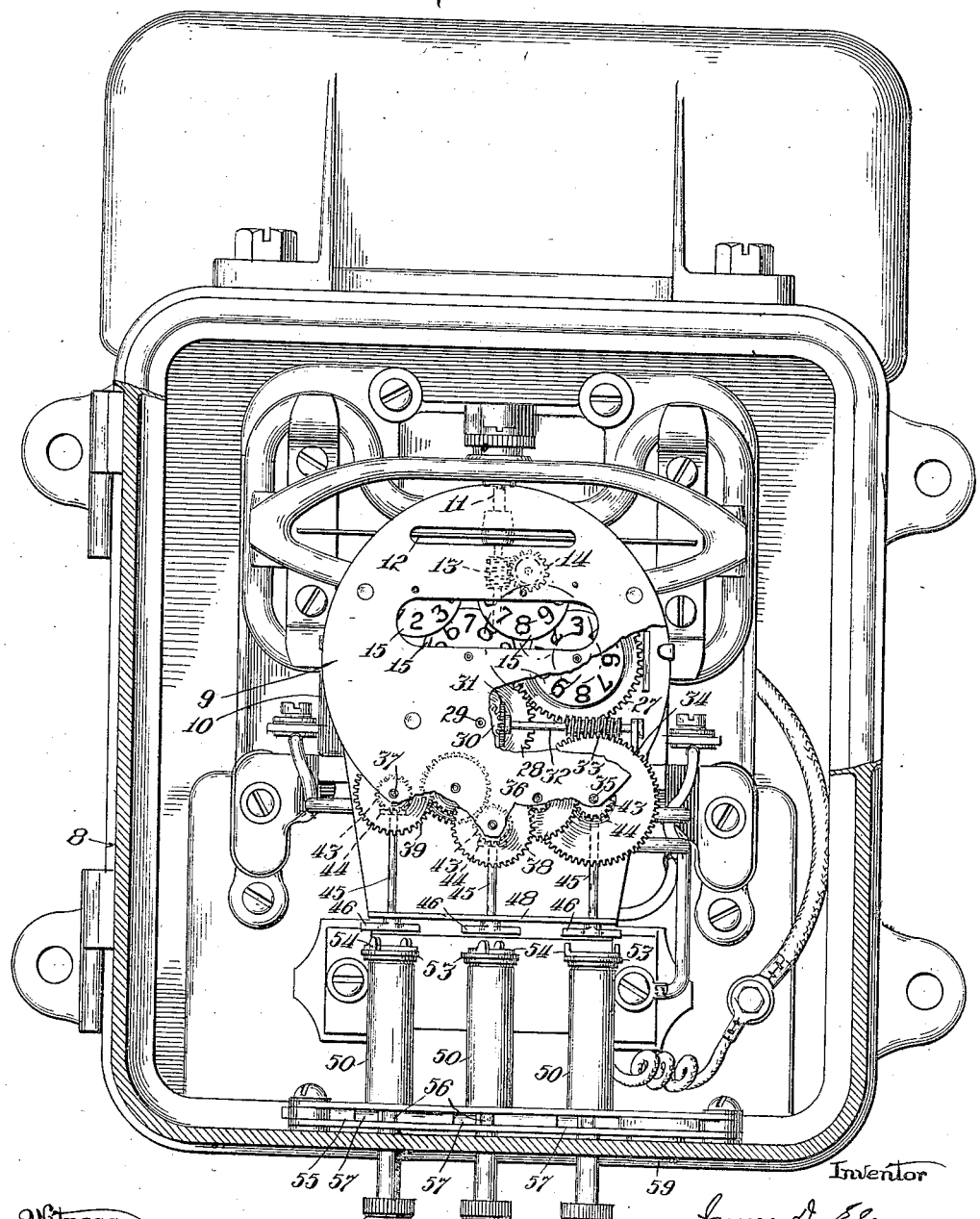
Fig. 7 is a front view of a meter with the cover removed and certain parts being broken away, illustrating the general arrangement of the apparatus.

In the drawings I have shown my invention as embodied in a watt hour meter of the mercury motor type, but it may be applied also to other types of electricity meters arranged to register either watt hours or ampere hours.

Referring now to the drawings for a description of the embodiment of my invention therein illustrated,—8 indicates the casing of a meter which encloses the operating parts and is provided with an opening to expose a dial plate 9. It is believed to be unnecessary to illustrate or describe the principal operating parts of the meter as they may be of any approved construction, such for example as that shown and described in Letters Patent No. 1,221,934, granted to the Sangamo Electric Company April 10, 1917, on the application of Otis White. For present purposes it will suffice to say that the meter illustrated comprises a mercury containing chamber 10 indicated in Fig. 7, in which rotates an armature having a vertically disposed armature shaft 11 which carries a damping disc 12 and is connected by suitable gearing, such as a worm 13 and worm wheel 14, with a suitable registering train. The registering train shown is of the cyclometer type and carries a series of number bearing discs 15 which are exposed through sight openings 16 provided in the dial 9 so as to give the reading of the meter in watt hours or ampere hours as the case may be. The dial illustrated is also provided with a rotating hand indicator 17 which indicates fractional parts of a kilowatt hour, and is geared to carry to the units indicator, as shown in Fig. 1. The meter is, of course, connected up with the source of power and with the translating devices in the usual way so that the current consumed is shown by the registering devices. As thus far described the meter is old and no claim is made thereto.

18, 19, 20 indicate three dials suitably inscribed to cooperate with silent pointers 21, 22, 23, respectively, and with driven pointers 24, 25, 26, respectively, to indicate different inspection periods, as will be more particularly hereinafter set forth. For example, the dial 18 may be appropriated to the indication of inspection periods relative to the brakes and controllers of electrically operated street cars; the dial 19 may be appropriated to indicating inspection periods relative to oiling; and the dial 20 may be appropriated to indicate when general inspection is required, but the particular inspection period to the indication of which any given dial may be appropriated will depend upon circumstances.

In the apparatus illustrated the several silent pointers 21, 22, 23 are rotatably mounted on their respective dial plates so that they may be adjusted by hand, but they are not mechanically driven and when adjusted to any given position remain in such position. The driven pointers 24, 25, 26 are arranged to be driven by the meter proper through a suitable train of gears connecting with the driving train of the meter discs 15 and in the embodiment of my invention shown the several driven pointers are inter-connected so that they may be driven from the driving train of the meter through a single set of connecting gears. It will be apparent that when the registering train of the meter proper is in operation, the several driven pointers 24, 25, 26 will rotate at speeds dependent upon the size of the gears through which they are respectively driven, and that if the silent pointers are set with reference to their respective dials to indicate when inspection is due the observer can determine at a glance by the position of the driven pointers whether or not such inspection times have arrived, this being indicated when any driven pointer comes into registration with the cooperating silent pointer. When this occurs and the proper inspection has been made, provision is made by which the appropriate indicator may be reset by turning its driven pointer back to its initial position. This, of course, must be done independently of the other traveling pointers and independently of the registering train of the meter proper.

The driving train through which the several driven pointers are actuated is best shown in Figs. 2, 3 and 7, by reference to which it will be seen that a gear 27 is connected with the arbor of the units disc of the meter proper, which gear meshes with a gear 28 carried on an arbor 29, which also carries a bevelled pinion 30 which meshes with a pinion 31 mounted on a shaft 32, which carries a worm 33. This worm meshes with a worm wheel 34, which is the initial gear of a train which connects a series of arbors 35, 36, 37 which carry the driven pointers 24, 25, 26, respectively. As this train may be of any suitable construction it is not believed to be necessary to indicate each of the gears by reference numerals. It will suffice to say that each of said arbors carries a driving gear, the gear 34 being mounted on the arbor 35, while the arbor 36 carries a gear 38, and the arbor 37 carries a gear 39, as shown in Fig. 3. These gears are not keyed on their respective arbors, but are normally caused to rotate therewith by means of spring washers 40, 41, 42, respectively, which are keyed on their respective arbors and frictionally engage said gears. Thus the arbors are capable of being rotated independently of the gears 34, 38 and 39 when it is desired to reset any one of the driven pointers, but at other times such pointers are driven through the registering train of the meter proper through the intermediate gears.

For resetting the several driven pointers each of the arbors 35, 36, 37 is provided with a pinion 43 keyed thereto and meshing with a pinion 44 carried at the upper end of a vertical shaft 45 which at its lower end is provided with a cross-head 46, as shown in Figs. 2 and 5. These shafts are mounted in suitable brackets 47, 48, as shown in Fig. 2, the cross-heads 46 lying below the bracket 48. Axially alined with each shaft 45 is a longitudinally movable shaft 49 which is mounted in a sleeve 50 suitably secured to the frame of the apparatus, as shown in Fig. 2, the lower portion of said shaft extending down through the case 8 where it is provided with a head 51 by means of which the shaft may be rotated or moved upward. A spring 52 mounted on the shaft 49 within the sleeve 50 serves to normally hold the shaft in its lowermost position. At its upper end each of the shafts 49 carries a disc 53 upon which is secured a yoke 54 which normally lies under but out of contact with the cross-head 46 at the lower end of the shaft 45. By moving the shaft 49 upward, however, the yoke 54 may be caused to engage the cross-head 46, whereupon by rotating the shaft 49 the shaft 45 may be rotated. Rotation of the shaft 45 operates through pinions 44, 43 to rotate the arbor on which the pinion 43 is mounted, thereby moving the driven pointer carried by such arbor. When a given pointer has been reset and the head 51 is released, the spring 52 moves the shaft 49 downward out of operative position so that the shaft 45 is free to turn idly as driven by the arbor with which it is connected.

It is desirable that means be provided for locking the several shafts 49 in inoperative position to prevent tampering by unauthorized persons with the apparatus, and for this purpose a locking plate 55 is provided, which, as shown in Figs. 2 and 7, is mounted in a horizontal position in the lower portion of the framework of the apparatus and is adapted to cooperate with grooves 56 in the lower portions of the shafts 49 to prevent endwise movement of said shafts. This locking plate is provided with slots 57 for the passage of the shafts 49, into which slots project lips 58 so disposed that when said locking plate 55 is in operative position the said lips project into the grooves 56, as shown in Fig. 2. By moving said locking plate endwise, however, the lips 58 may be moved out of the grooves 56, leaving the shaft 49 free to move endwise. The locking plate 55 is provided with a key operated lock 59 of any suitable description, so that by inserting a key said locking plate may be moved into or out of operative position. While this form of locking device is effective for the purpose described, it will be evident that any other suitable locking means may be employed.

From the foregoing description it will be understood that the apparatus illustrated indicates at a glance whether or not the translator of energy to which it is applied is due for inspection of one character or another, and that as the movement of the driven pointers is dependent on the work done by the translator of energy, or what is substantially the same thing, on the energy consumed thereby as measured by the flow of current through the translating device the times when the several inspections are due are measured according to a reliable and accurate basis. I have not deemed it necessary to illustrate a translating device as the apparatus described may be used with any suitable device, such as a street car, for example, and only the ordinary connections are required.

So far as I am aware I am the first in the art to provide a translator of electric energy with an inspection indicator comprising electrically operated means correlated with or controlled by the power consumed by said translator for indicating predetermined inspection periods, and the claims hereinafter made are, therefore, to be construed accordingly. I wish it to be understood further that while my invention is primarily designed for use in connection with translators of electrical energy it may also be applied to any other use for which it is adapted.

What I claim as my invention and desire to secure by Letters Patent, is—

1. An apparatus for indicating inspection periods comprising a motor element adapted to be controlled by electric energy flowing to a translating device, an inspection indicator correlated with said motor element, and means for resetting said indicator.

2. The combination with an electricity meter, of a plurality of inspection indicators actuated by said meter and correlated therewith to indicate different inspection periods measured by the operation of said meter, and means for resetting said indicators independently of one another and of the meter.

3. An electricity meter comprising a case, a dial plate, means in said case for indicating on said dial plate the energy consumption in the circuit with which the meter is connected, and separate means on said dial plate correlated with the energy consumption measured by the meter for indicating inspection periods.

4. An electricity meter comprising a case, a dial plate, means in said case for indicating on said dial plate the energy consumption in the circuit with which the meter is connected, separate means on said dial plate correlated with the energy consumption measured by the meter for indicating inspection periods, and means for independently resetting the latter indicating means.

JAMES D. ELSOM.